(12) United States Patent
Brunnett et al.

(10) Patent No.: US 8,988,812 B1
(45) Date of Patent: Mar. 24, 2015

(54) MULTI-SENSOR ARRAY CONFIGURATION FOR A TWO-DIMENSIONAL MAGNETIC RECORDING (TDMR) OPERATION

(71) Applicant: Western Digital (Fremont), LLC, Fremont, CA (US)

(72) Inventors: Donald Brunnett, Pleasanton, CA (US); Gerardo A. Bertero, Redwood City, CA (US); Shaoping Li, San Ramon, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/325,643

(22) Filed: Jul. 8, 2014

Related U.S. Application Data

(60) Provisional application No. 61/909,905, filed on Nov. 27, 2013.

(51) Int. Cl.
*G11B 15/12* (2006.01)
*G11B 21/02* (2006.01)
*G11B 5/09* (2006.01)

(52) U.S. Cl.
CPC .......................................... *G11B 5/09* (2013.01)
USPC ............................................... 360/55; 360/75

(58) Field of Classification Search
None
See application file for complete search history.

(56) References Cited

U.S. PATENT DOCUMENTS

| | | |
|---|---|---|
| 3,780,266 A | 12/1973 | Mudsam et al. |
| 4,012,781 A | 3/1977 | Lin |
| 4,597,023 A * | 6/1986 | Rijckaert .................. 360/77.14 |
| 5,229,901 A | 7/1993 | Mallary |
| 5,270,892 A | 12/1993 | Naberhuis |
| 5,309,305 A | 5/1994 | Nepela et al. |
| 5,321,557 A * | 6/1994 | Shimotashiro et al. ..... 360/77.14 |
| 5,353,176 A * | 10/1994 | Kosuge ........................... 360/63 |
| 5,388,014 A | 2/1995 | Brug et al. |
| 5,508,868 A | 4/1996 | Cheng et al. |
| 5,523,904 A | 6/1996 | Saliba |
| 5,684,658 A | 11/1997 | Shi et al. |
| 5,696,654 A | 12/1997 | Gill et al. |
| 5,721,008 A | 2/1998 | Huang et al. |
| 5,796,535 A | 8/1998 | Tuttle et al. |
| 5,831,888 A | 11/1998 | Glover |
| 5,963,400 A | 10/1999 | Cates et al. |
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |

(Continued)

OTHER PUBLICATIONS

Shaoping Li, et al., U.S. Appl. No. 13/928,799, filed Jun. 27, 2013, 27 pages.

(Continued)

*Primary Examiner* — Thang Tran

(57) ABSTRACT

A data storage device comprising a transducer that includes a sensor array comprising multiple read sensors in a down track direction. A first pair of sensors in the sensor array reads data from a track, and at least one read sensor reads noise from an adjacent track.

28 Claims, 10 Drawing Sheets

(56) References Cited

U.S. PATENT DOCUMENTS

| | | |
|---|---|---|
| 6,058,094 A | 5/2000 | Davis et al. |
| 6,071,007 A | 6/2000 | Schaenzer et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,104,562 A | 8/2000 | Ottesen et al. |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,154,335 A | 11/2000 | Smith et al. |
| 6,157,510 A | 12/2000 | Schreck et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,191,925 B1 | 2/2001 | Watson |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,216,242 B1 | 4/2001 | Schaenzer |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,271,998 B1 | 8/2001 | Coehoorn et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,311,551 B1 | 11/2001 | Boutaghou |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,341,102 B1 | 1/2002 | Sato et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,362,528 B2 | 3/2002 | Anand |
| 6,369,982 B2 | 4/2002 | Saliba |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,449,131 B2 | 9/2002 | Guo et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,541 B1 | 10/2002 | Wang et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,333 B1 | 12/2002 | Han et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |

(56) References Cited

U.S. PATENT DOCUMENTS

| | | |
|---|---|---|
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,674,618 B2 | 1/2004 | Engel et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,842,312 B1 | 1/2005 | Alstrin et al. |
| 6,859,343 B1 | 2/2005 | Alfoqaha et al. |
| 6,859,997 B1 | 3/2005 | Tong et al. |
| 6,861,756 B2 | 3/2005 | Saito et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,253 B1 | 5/2005 | Rogers et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,247 B2 | 9/2005 | Schwarz et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 6,995,957 B2 | 2/2006 | Jayasekara |
| 7,002,777 B2 | 2/2006 | Ogawa et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,106,549 B2 | 9/2006 | Asakura |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,807 B1 | 3/2007 | Liikanen et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,215,514 B1 | 5/2007 | Yang et al. |
| 7,238,292 B1 | 7/2007 | He et al. |
| 7,239,465 B1 | 7/2007 | Watson et al. |
| 7,239,478 B1 | 7/2007 | Sin et al. |
| 7,242,547 B2 | 7/2007 | Ogawa |
| 7,248,431 B1 | 7/2007 | Liu et al. |
| 7,248,433 B1 | 7/2007 | Stoev et al. |
| 7,248,449 B1 | 7/2007 | Seagle |
| 7,259,927 B2 | 8/2007 | Harris |
| 7,271,970 B2 | 9/2007 | Tsuchiya |
| 7,280,325 B1 | 10/2007 | Pan |
| 7,283,327 B1 | 10/2007 | Liu et al. |
| 7,284,316 B1 | 10/2007 | Huai et al. |

(56) References Cited

U.S. PATENT DOCUMENTS

| | | |
|---|---|---|
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,315,072 B2 | 1/2008 | Watanabe |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,168 B2 | 5/2008 | Wu et al. |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,405,907 B2 | 7/2008 | Raastad |
| 7,408,730 B2 | 8/2008 | Yamagishi |
| 7,417,832 B1 | 8/2008 | Erickson et al. |
| 7,419,891 B1 | 9/2008 | Chen et al. |
| 7,420,758 B2 | 9/2008 | Inoue et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,632 B2 | 10/2008 | Li et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,502,193 B2 | 3/2009 | Albrecht et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,619,194 B2 | 11/2009 | Kobashi |
| 7,639,457 B1 | 12/2009 | Chen et al. |
| 7,652,847 B2 | 1/2010 | Weiss et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,755,863 B2 | 7/2010 | Neumann et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,868,362 B2 | 1/2011 | Randazzo et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,009,388 B2 | 8/2011 | Oh et al. |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,139,301 B1 | 3/2012 | Li et al. |
| 8,141,235 B1 | 3/2012 | Zhang |
| 8,144,424 B2 | 3/2012 | Dugas et al. |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,228 B2 | 6/2012 | Maat et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |

(56) References Cited

U.S. PATENT DOCUMENTS

| | | |
|---|---|---|
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,384,220 B2 | 2/2013 | Saito et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,508 B1 * | 12/2013 | Burd .............................. 360/75 |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |

(56) References Cited

U.S. PATENT DOCUMENTS

| | | | |
|---|---|---|---|
| 8,790,524 B1 | 7/2014 | Luo et al. | |
| 8,790,527 B1 | 7/2014 | Luo et al. | |
| 8,792,208 B1 | 7/2014 | Liu et al. | |
| 8,792,312 B1 | 7/2014 | Wang et al. | |
| 8,793,866 B1 | 8/2014 | Zhang et al. | |
| 8,797,680 B1 | 8/2014 | Luo et al. | |
| 8,797,684 B1 | 8/2014 | Tran et al. | |
| 8,797,686 B1 | 8/2014 | Bai et al. | |
| 8,797,692 B1 | 8/2014 | Guo et al. | |
| 8,813,324 B2 | 8/2014 | Emley et al. | |
| 2004/0184181 A1* | 9/2004 | Fukuda et al. | 360/77.13 |
| 2005/0036241 A1 | 2/2005 | Tsuda et al. | |
| 2005/0036437 A1* | 2/2005 | Learned et al. | 369/124.02 |
| 2007/0242378 A1* | 10/2007 | Ikegami et al. | 360/39 |
| 2008/0203279 A1 | 8/2008 | Kobashi | |
| 2010/0020435 A1* | 1/2010 | Chen et al. | 360/77.02 |
| 2010/0290157 A1 | 11/2010 | Zhang et al. | |
| 2011/0086240 A1 | 4/2011 | Xiang et al. | |
| 2012/0111826 A1 | 5/2012 | Chen et al. | |
| 2012/0216378 A1 | 8/2012 | Emley et al. | |
| 2012/0237878 A1 | 9/2012 | Zeng et al. | |
| 2012/0282492 A1 | 11/2012 | Sasaki et al. | |
| 2012/0298621 A1 | 11/2012 | Gao | |
| 2013/0216702 A1 | 8/2013 | Kaiser et al. | |
| 2013/0216863 A1 | 8/2013 | Li et al. | |
| 2013/0257421 A1 | 10/2013 | Shang et al. | |
| 2013/0286502 A1* | 10/2013 | Erden et al. | 360/76 |
| 2014/0154529 A1 | 6/2014 | Yang et al. | |
| 2014/0160590 A1* | 6/2014 | Sankaranarayanan et al. | 360/45 |
| 2014/0175050 A1 | 6/2014 | Zhang et al. | |

OTHER PUBLICATIONS

Donald Brunnett, et al., U.S. Appl. No. 14/203,358, filed Mar. 10, 2014, 11 pages.

Shaoping Li, et al., U.S. Appl. No. 14/046,771, filed Oct. 4, 2013, 43 pages.

Shaoping Li, et al., U.S. Appl. No. 13/963,172, filed Aug. 9, 2013, 37 pages.

Steven C. Rudy, et al., U.S. Appl. No. 14/045,022, filed Oct. 3, 2013, 31 pages.

Shaoping Li, et al., U.S. Appl. No. 14/097,157, filed Dec. 4, 2013, 38 pages.

Shaoping Li, et al., U.S. Appl. No. 13/928,799, filed Jun. 27, 2013, 13 pages.

* cited by examiner

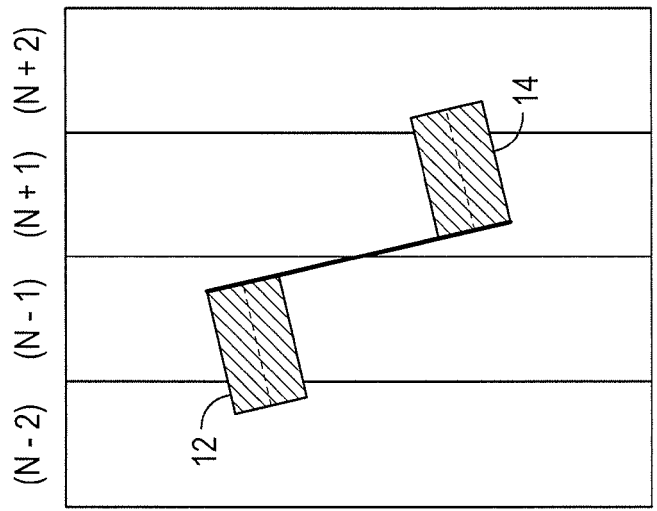
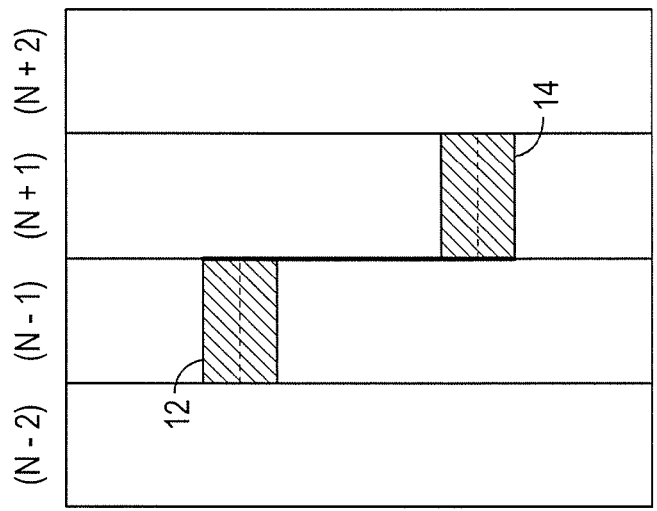
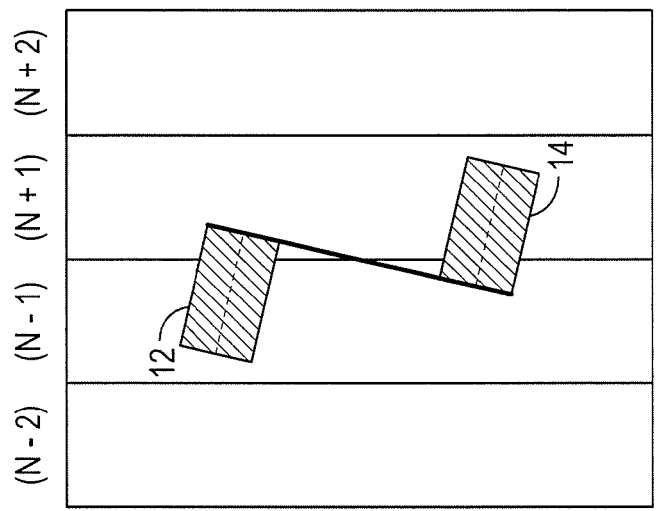

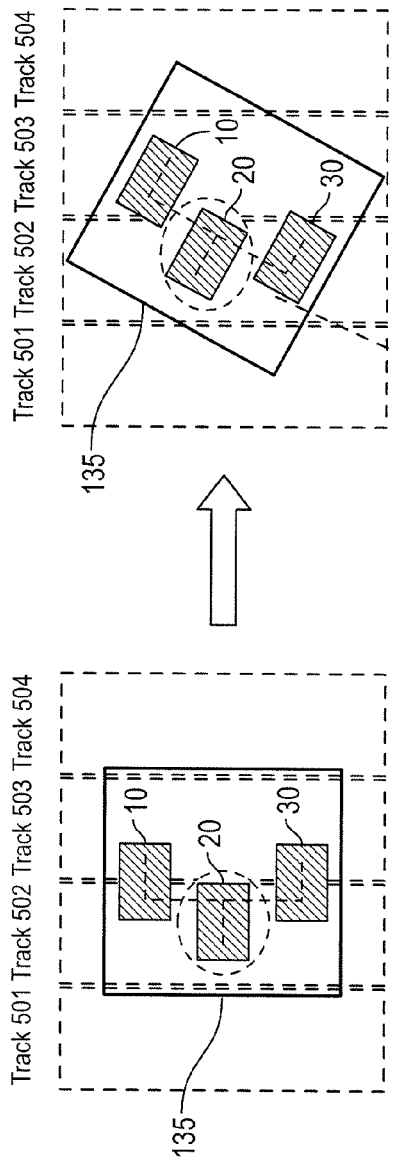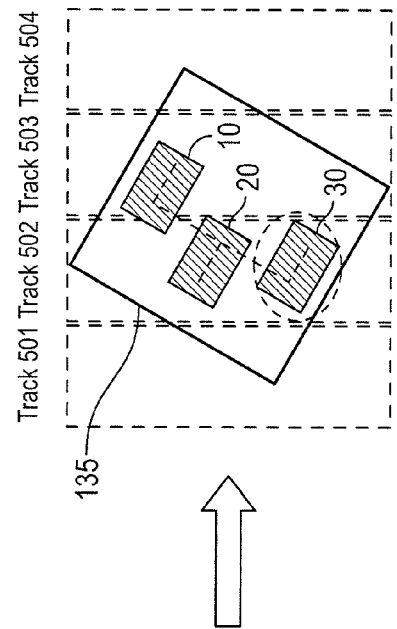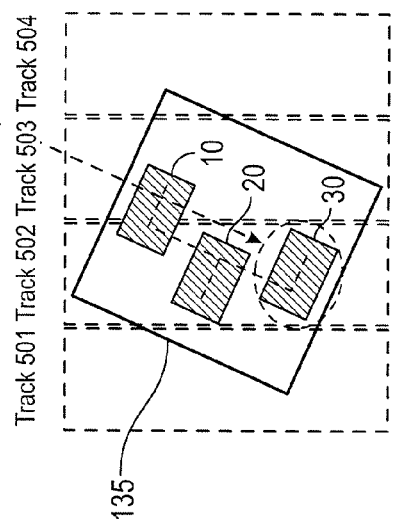

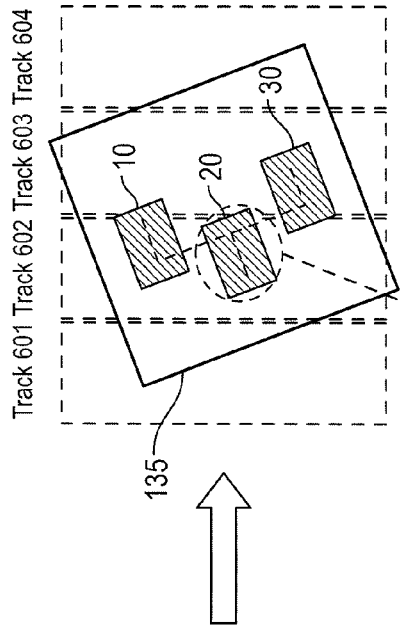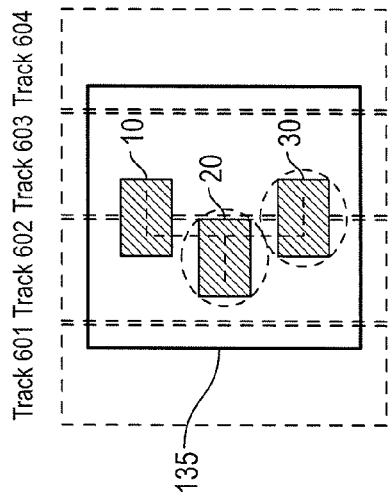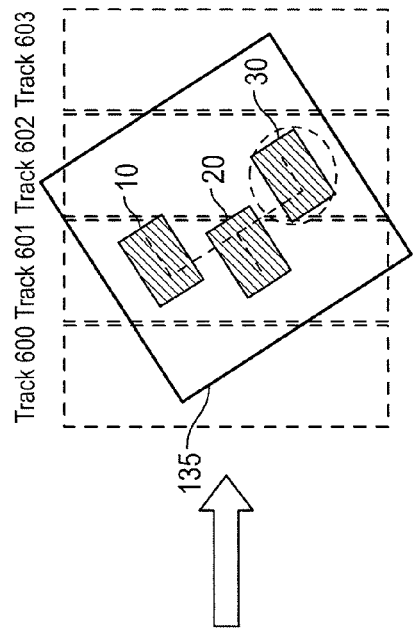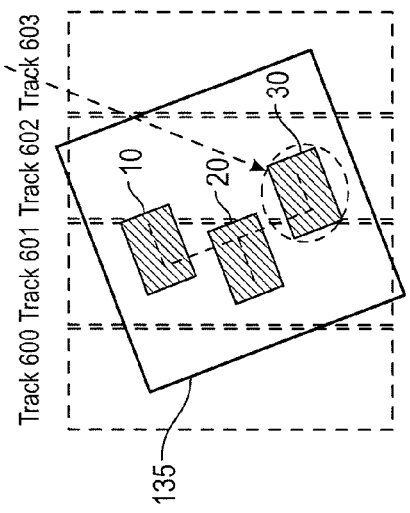

US 8,988,812 B1

MULTI-SENSOR ARRAY CONFIGURATION FOR A TWO-DIMENSIONAL MAGNETIC RECORDING (TDMR) OPERATION

RELATED APPLICATIONS

This application claims priority to U.S. Provisional Patent Application Ser. No. 61/909,905 entitled "MULTI-SENSOR ARRAY CONFIGURATION FOR A TDMR OPERATION," filed on Nov. 27, 2013 for Donald Brunnett, which is incorporated herein by reference. This application is related to "MULTIPLE SENSOR ARRAY USABLE IN TWO-DIMENSIONAL MAGNETIC RECORDING," U.S. patent application Ser. No. 13/928,799, filed on Jun. 27, 2013 for Shaoping Li, which is incorporated by reference herein. This application is also related to "DISK DRIVE EMPLOYING MULTIPLE READ ELEMENTS TO INCREASE RADIAL BAND FOR TWO-DIMENSIONAL MAGNETIC RECORDING," Ser. No. 14/203,358, filed on Mar. 10, 2014 for Donald Brunnett, the contents of which are incorporated by reference herein.

BRIEF DESCRIPTION OF THE DRAWINGS

FIGS. 2A-2F illustrate various possible positions of a dual-sensor array relative to a media surface.

FIGS. 5A-5D illustrates another configuration of a sensor array for performing a TDMR operation as a read transducer moves from a middle diameter to an outer diameter of the media.

FIGS. 6A-6D illustrates yet another configuration of a sensor array for performing a TDMR operation as a read transducer moves from a middle diameter to an outer diameter of the media.

DETAILED DESCRIPTION

Figure 1A:
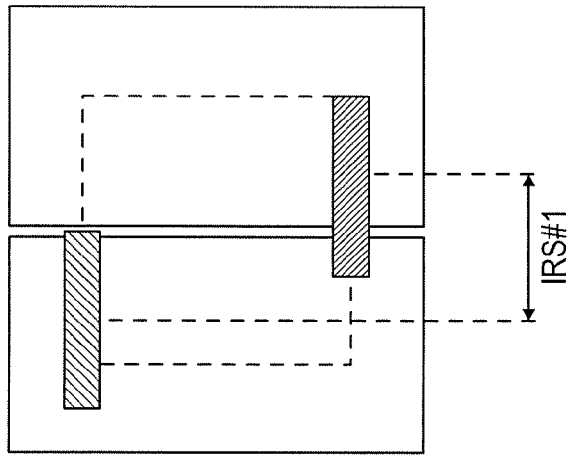
FIG. 1A illustrates sensors at a zero skew position.
Figure 1B:
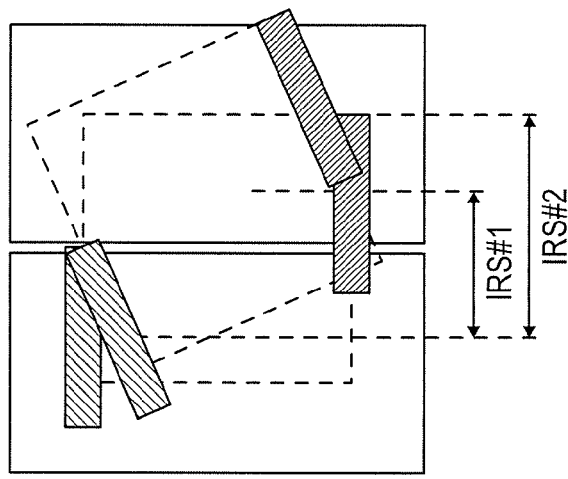
FIGS. 1B and 1C illustrate how skew is expected to impact a dual sensor array.
Figure 1C:
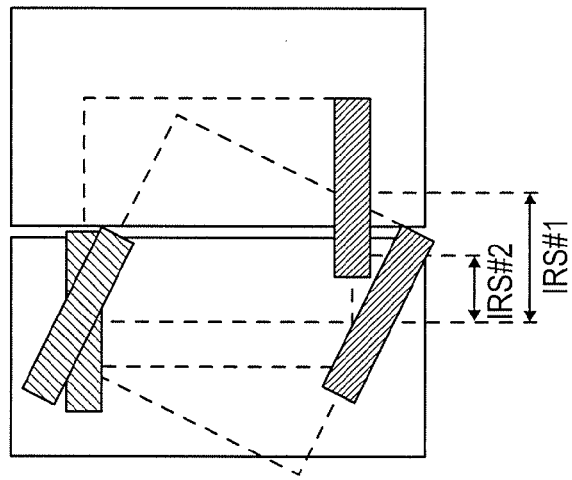

FIGS. 1A-1C illustrate how skew can impact the position of sensors on the media. The orientation of the two sensors at zero skew appears in FIG. 1A, where the inter-reader spacing (IRS) corresponds to the distance between sensors measured from the center of a first sensor to the center of a second sensor.

FIGS. 1B and 1C illustrate the impact of different skew angles on the distance separating two sensors. The IRS between two sensors along the cross track direction varies at different skew angles. When the dual sensor array experiences a negative skew angle, the spacing separation between the sensors increases to IRS#2 as shown in FIG. 1B. Conversely, when the sensors in dual sensor array experience a positive skew angle, the sensors are drawn closer together as indicated by the smaller spacing separation (IRS#2) in FIG. 1C.

Figure 2F:
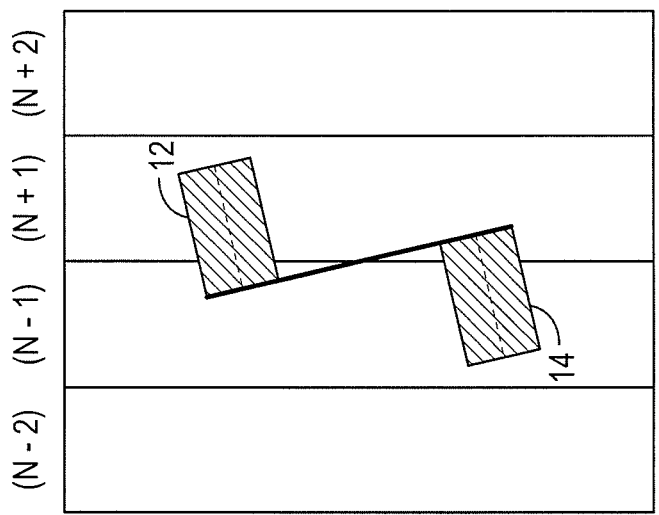

FIGS. 2A-2F illustrate several possible configurations for reading a media with a dual sensor array. Specifically, FIGS. 2A-2C illustrate a dual sensor array in different skew angle conditions. FIG. 2B shows the zero skew condition at the middle diameter (MD) when read sensors 12 and 14 are well aligned with tracks N−1 and N−1. As the disk rotates, the actuator holding the sensors 12,14 may skew either toward the outer diameter or inner diameter (ID) of the media. At the ID condition, of FIG. 2C, both sensors move closer together from an initial position shown in FIG. 2B. It is believed that a two-dimensional DSP process can perform inner track interference (ITI) cancellation more effectively when two adjacent sensors overlap as is the situation shown in FIG. 2C. This may be because two adjacent sensors can pick up the signal and noise in two adjacent written tracks, e.g., N−1 and N+1 tracks. On the other hand, at the outer diameter of the media (OD) (FIG. 2A), sensors 12, 14 move apart or their separation increases. In FIG. 2A, both sensors start to sense noise from tracks N+2 and N−2 at OD locations. In the situation of FIG. 2A, a two dimensional DSP process might not be able to compensate or eliminate the noises from the written tracks of N−2 and N+2 because no reference signals are taken from those two tracks. Thus, at OD locations, the misalignment issue could cause a more serious BER deterioration than the ID condition of FIG. 2C.

Figure 2E:
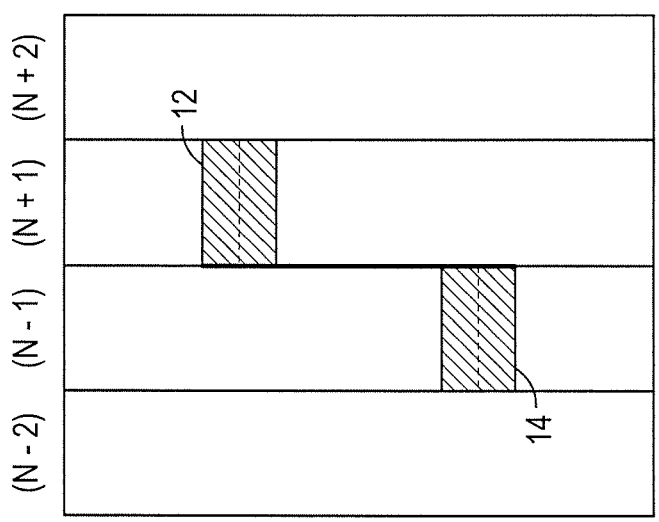
Figure 2D:
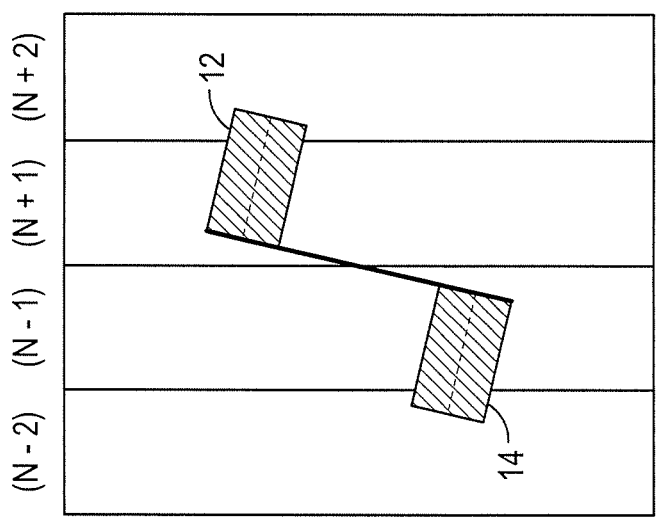

FIGS. 2D, 2E and 2F illustrate a different dual sensor array than the dual sensor array shown in FIGS. 2A, 2B and 2C. The manner in which the dual sensor array of FIGS. 2D, 2E and 2F operates under different skew angle conditions is described below. As before, FIG. 2E illustrates the zero skew condition at the middle diameter where both read sensors are well aligned with written tracks N−1 and N+1. When the two sensors are skewed at a positive 13 degree angle, shown in FIG. 2F, the sensors start to pick up noise from tracks N−2 and N+2. Thus at ID conditions, the misalignment issue may cause serious BER deterioration. The dual sensor array of FIGS. 2A, 2C, 2D and 2F contributes to recurring misalignment when the dual sensors are skewed away from the desired track on the media. To overcome the problems of FIGS. 2A-2F, new sensor array designs were developed to handle skew-induced data operations.

In one embodiment, the disclosure provides a disk drive having an actuator, control circuitry for controlling the actuator, a rotating media surface for recording and reproducing data, and a head that includes a read transducer having a mufti-sensor array (transducer). The media surface has a plurality of concentric tracks defining radially separated data tracks. Each data track is written with an offset from a corresponding servo track centerline depending on a skew introduced by an actuator responding to control circuitry.

Figure 3A:
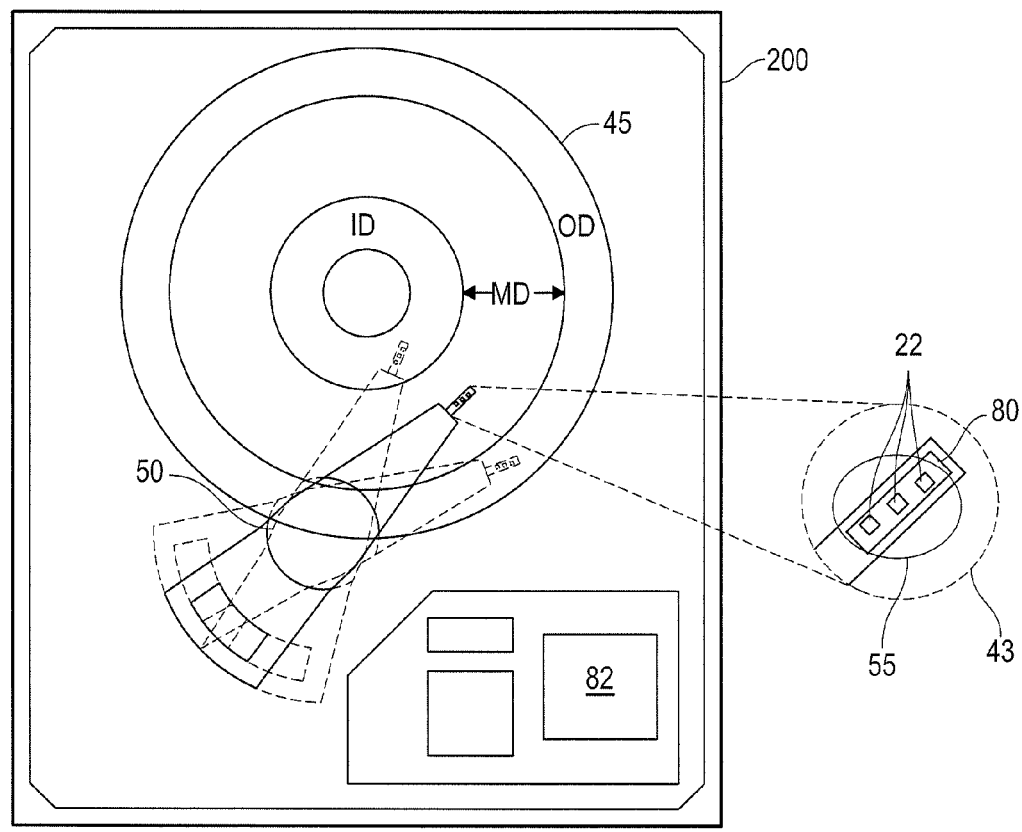
FIG. 3A is a simplified plan view of a disk drive.

FIG. 3A illustrates a plan view of disk drive 200, showing transducer 55 on an actuator arm (actuator 50) above media 45. For simplicity only one actuator 50 is shown. However it is understood that the assembly comprises multiple actuators that extend from a voice coil motor (not shown). Each actuator 50 is associated with one or more respective media surfaces, such as disk 45.

FIG. 3A also illustrates an enlarged view of magnetoresistive head 43, which includes one or more transducers. For clarity, only a single transducer 55 comprised of multiple sensors is shown. Transducer 55 may be fabricated on slider 80. Slider 80 may be attached to suspension 75 and suspension 75 may be supported by actuator 50 as shown in FIG. 3B.

Described herein is a mechanism for performing TDMR using a novel sensor arrangement. Read sensors are vertically aligned to form a sensor array 55. Although transducer 55 is shown having three read sensors 22, a different number of sensors may be provided.

As the transducer 55 moves from the MD region to either the inner diameter ID or the outer diameter OD actuator 50 experiences a change in skew angle between −17 and +17 degrees. One or more transducers may be disposed on each side of a magnetoresistive head, the magnetoresistive head being positioned on actuator 50. Each transducer 55 may contain multiple read sensors 22. In some embodiments, a magnetoresistive head may have one write transducer and a read transducer on one side and on an opposite side of the head both a write transducer and read transducer may also be present.

Figure 3B:
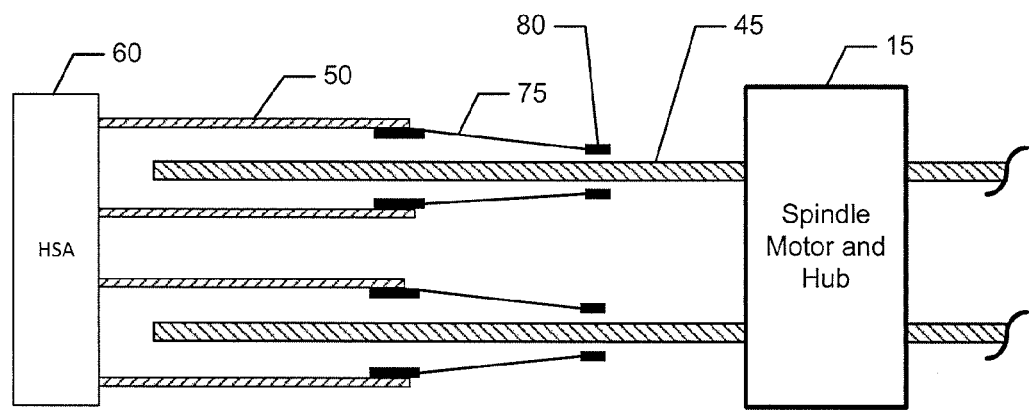
FIG. 3B illustrates a side view of the disk drive shown in FIG. 3A.

FIG. 3B illustrates a side view of storage device 200 shown in FIG. 3A. At least one disk media 150 is mounted onto spindle motor and hub 15. HSA 60 comprises at least one actuator 50 that carries suspension 75 and slider 80. Slider 80 has an Air Bearing Surface (ABS) facing media 150. When the media is rotating and actuator 50 is positioned over the media 150, slider 80 floats above media 150 by aerodynamic pressure created between the slider ABS and the surface of media 150 facing the ABS of slider 80.

Disk 45 is shown having an inner diameter (ID) and an outer diameter (OD). The region between the ID and OD is the middle diameter of the disk or MD. When actuator 50 is above the MD of disk 45, transducer 55 may have a zero degree skew angle.

The unique structure of the sensor array on transducer 55 is further detailed below. To reduce the skew-induced misalignment problems for a TDMR operation, various different embodiments of sensor array 22 have been developed. In addition, this disclosure encompasses methods for operating a novel sensor array and a storage device that incorporates the novel sensor array.

Sensor array 22 is shown as part of transducer 55 in FIG. 3A. The transducer 55 and suspension may be part of a storage device 200. Storage device 200 includes a media 45 having concentric data tracks, and a suspension upon which at least one transducer 55 having an air-bearing surface is attached. The suspension 75 is shown supported by actuator 50 in FIG. 3B. Actuator 50 operates to move the transducer 55 in close proximity to the media 45. Also included in the storage device 200 is control circuitry that is coupled to actuator 50, such as any suitable integrated circuit or circuits.

For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC. For simplicity, the above means of control circuitry is referred to hereinafter as read channel 82.

In some embodiments, during operation of disk drive 200, disk 45 is rotated about a spindle axis 15 at a generally constant rate. At least one disk media 150 is mounted onto spindle 15. HSA 60 comprises at least one actuator 50 that carries suspension 75 and slider 80. Slider 80 has an Air Bearing Surface (ABS) facing media 150. When the media is rotating and actuator 50 is positioned over the media 150, slider 80 floats above media 150 by aerodynamic pressure created between the slider ABS and the surface of media 150 facing the ABS of slider 80.

The method for reading data with sensor array 22 can lead to a minimum misalignment effect at both the inner diameter (ID) and outer diameter (OD) of the media. In one embodiment, the method relies on transducer 400 shown in FIGS. 4A-4C. Transducer 400 includes sensor array 22 and at least two shields 140, 142.

Figure 4A:
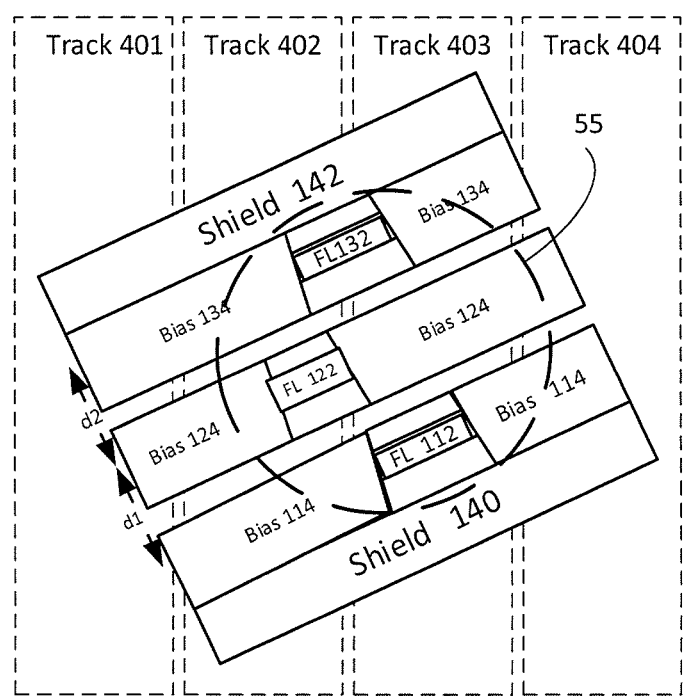
FIGS. 4A-4C illustrate one configuration of a sensor array.
Figure 4B:
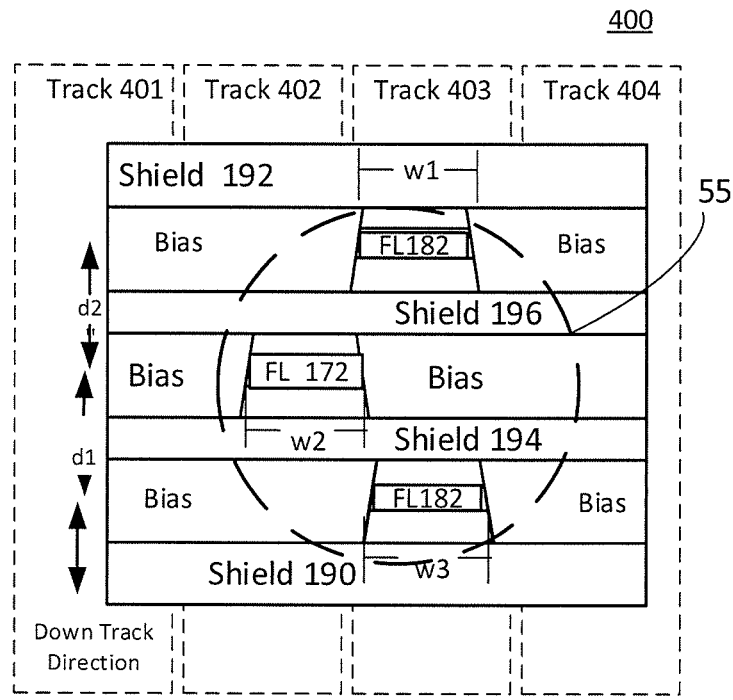
Figure 4C:
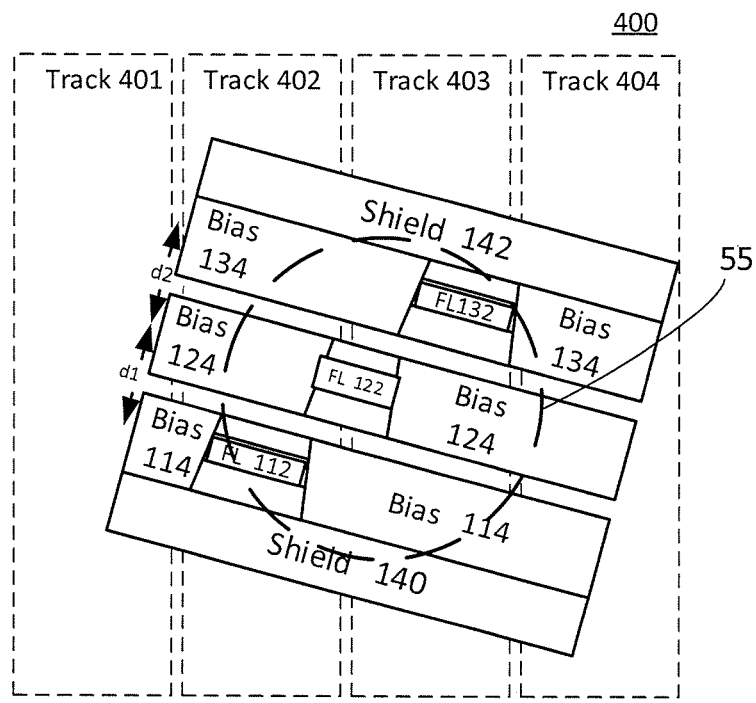

FIGS. 4A-4C illustrate transducer 400 facing the air bearing surface of media 150. Tracks 401, 402, 403 and 404 form part of media 150. For simplicity, only four tracks are shown. However, the media 150 may include more than four tracks. The opposite side of magnetoresistive head 400 may also have a sensor array that senses data and/or noise from a second media surface (not shown). Each sensor (10, 20, 30) in sensor array 55 in FIGS. 4A-4C is separated by at least one distance from an adjacent sensor in a down track direction (d1 or d2). In certain embodiments, distance d1 may equal distance d2. In other embodiments distance d1 does not equal distance d2. Distances d1 and d2 may each be at least 50 nanometers and not more than 400 nanometers. Although only three sensors are shown it is understood that transducer 400 may have a different number of sensors. During reading of media 150, read sensors 10, 20 and 30 are displaced in the track width direction. In FIGS. 4A-4C read sensor 20 functions as the data sensor for reading data from target track 402. However, in other embodiments sensor 10 or sensor 30 can function as the data sensor.

Read sensors (or sensors) 10, 20 and 30 in FIGS. 4A-4C have widths, w1, w2 and w3, respectively, in the track width direction. In some embodiments, sensor 20 has the smallest width, w1, while sensors 10 and 30 are wider. In other embodiments, sensors 10 and 30 have the same width (w1=w3). However, yet in other embodiments, other widths are possible. The widths of sensors 10, 20 and 30 may also be based on the track pitch. The track pitch is the distance from the center of one track to the center of the next track. The width, w2, is at least fifty and not more than one hundred twenty percent of the track pitch. In some such embodiments, the width of sensor 20 is at least sixty percent and not more than one hundred percent of the track pitch. Yet in other embodiments, the width of sensor 20 is at least eighty percent and not more than one hundred twenty percent of the track pitch.

In some embodiments, the widths w1 and w3 are at least equal to the track pitch and not more than twice the track pitch. In some such embodiments, the widths w1 and w3 are each at least one hundred twenty percent and not more than one hundred fifty percent of the track pitch. In other embodiments, the widths w1, w2 and/or w3 may be different. Further, the widths may depend not only on the track pitch, but also on the distance between the sensors 10, 20 and 30. In some embodiments, the width(s) of sensors 10 and 30 increase with increasing distance from sensor 20 along the cross track direction. In other embodiments, the widths of the sensors 10, 20 and 30 may vary in another manner.

The plurality of read sensors 10, 20 and 30 are displaced along the cross track direction. Therefore, in several embodiments, the centers of each of the read sensors 10, 20 and 30 are not aligned along a vertical line that runs along the down track direction. Read sensors 10, 20 and 30 may also overlap in the track width/cross track direction. The term "overlap" is used to mean the amount by which one sensor covers an adjacent sensor in the cross track direction. For example, if one sensor is 100 nm wide and another sensor is 100 nm wide and the two sensors overlap a total of 50 nm, then the percent overlap between two sensors would be 50 percent.

In some embodiments, read sensors 10, 20 and 30 overlap by at least 5% and not more than 90% of the widths w1, w2 and w3. In some such embodiments, read sensors 10, 20 and 30 overlap by at least thirty percent and not more than forty percent. Further, the amount of overlap may depend upon the distances d1 and d2 between the sensors 10, 20 and 30. In some embodiments, the overlap may be different. For example, sensors 10, 20 and 30 may not overlap, but instead may be spaced apart in the cross track direction.

Due to the rotation of disk 45, sensors 10, 20 and 30 can occupy different positions on the disk. The simplest case is when the sensor array is located above a target track 402 in the MD region with zero skew conditions as shown in FIG. 4B. For example, FIG. 4B illustrates sensor 20 above track 402, and sensors 10 and 30 are above track 403. Although sensors 10, 20 and 30 are not skewed in FIG. 4B, sensor 20 partially overlaps track 403 causing sensor 20 to sense both data and track edge noise. Hereinafter, the sensor most closely aligned to the target track is designated as the data sensor. However, it is understood that the data sensor reads data from a recording track as well as edge noise along one or more edges of the target track. In addition, "noise sensor" is used herein to refer to at least one sensor that reads edge noise at the edges of the track being read by the data sensor. To enhance the SNR of the data sensed by sensor 20, either sensor 10 or sensor 30 may collect the noise that affects the signal sensed by data sensor 20. For example, both sensors 10 and 30 can collect edge noise from an adjacent track. Any future reference in this application to noise is intended to refer to edge noise. A read channel 82 is configured to process signals from sensors 10, 20 and 30. When actuator 50 pivots toward the outer or inner diameter of media 150, sensors 10, 20, and 30 may extend across a greater number of tracks as shown in FIGS. 4A and 4C.

The read channel includes control circuitry that processes the signals emanating from the active sensors in sensor array 22. In several embodiments, such signals are processed as described in co-pending patent application Ser. No. 14/203,358. Thus, In one embodiment, the read signal generated by at least two of the read elements are processed to detect data recorded in a target data track using a two-dimensional demodulation algorithm meaning that the inter-track interference (ITI) caused by at least one adjacent data track is compensated in order to detect the data recorded in the target data track. Specifically, when detecting the data recorded in a target data track 402, the ITI caused by the adjacent data track 403 is compensated by processing the read signal generated by the noise sensor. The ITI compensation may be implemented in any suitable manner, such as by subtracting the read signal generated by the noise sensor from the read signal generated by the data sensor in the analog or digital domain. In another embodiment, the control circuitry 24 may employ two-dimensional digital equalization followed by a suitable two-dimensional sequence detector (e.g., a trellis type sequence detector such as a Viterbi detector). In another embodiment, the control circuitry 82 may employ two-dimensional (2D) to one-dimensional (1D) or 2D-to-1D digital equalization followed by a suitable one-dimensional sequence detector. In still another embodiment, the control circuitry 82 may process the read signal generated by the noise sensor to detect a data sequence recorded in the adjacent data track 403, convert the detected data sequence into ideal signal samples, and then subtract the ideal signal samples from the equalized signal samples of the read signal generated by the data sensor. The resulting compensated signal samples may then be processed using a suitable one-dimensional sequence detector.

FIG. 4A illustrates the situation when skew angle θ is approximately 13° toward the outer diameter of a disk. In FIG. 4A, sensor 20 is the data sensor and sensor 10 is the noise sensor. Since sensor 30 is above tracks 403 and 404, it may begin to collect noise from track 404. Alternatively, sensor 30 may be turned off and thus collect neither data nor noise. If sensor 30 is turned off it is considered dormant. FIG. 4C is an example of when actuator 50 is pivoted toward the inner diameter of the disk. In this situation, sensor 20 reads data and sensor 30 collects noise. Therefore, in FIG. 4C sensors 20 and 30 together perform the dual sensor TDMR operation, while sensor 10 is turned off. Specifically, sensor 10 will be turned off to avoid having any noise being collected by sensor 10 from track 404. In certain embodiments, the proposed sensor configuration, combined with some digital signal processing (DSP) ITI interference cancellation functionalities, can mitigate the skew induced misalignment shifts more effectively than conventional TDMR schemes.

In some embodiments, read sensor 20 in FIGS. 4A-4C functions as the data sensor. However in other embodiments the data sensor need not be a sensor that is centrally located in the sensor array. Since actuator 50 skews as the media rotates, a read sensor other than the central sensor may be more optimally aligned over a target track than the remaining sensors. This can be better understood in reference to FIGS. 5A-5D.

The overlap between a pair of sensors in the sensor array may vary at different skew angles. In this disclosure, overlap is used to refer to inter-reader spacing along the cross-track direction.

FIG. 5A illustrates sensors 10, 20 and 30 at zero skew along a middle diameter track. The sensor array in FIGS. 5A-5D includes sensor 10, sensor 20 and sensor 30. As in the case with FIGS. 4A-4C, sensors 10, 20 and 30 in FIGS. 5A-5C may have different widths. In one embodiment, sensor 20 has a first width, while sensors 10 and 30 of FIGS. 5A-5C may have a smaller width than sensor 20. In an alternative embodiment, sensors 10 and 30 may have a width that exceeds the width of sensor 20.

For clarity, the shield layers and bias materials are not shown in FIGS. 5A-5C. However, it is understood that sensors 10, 20 and 30 each contain shields and bias material as part of sensor array 55. In FIGS. 5A-5D, the data sensor in sensor array 55 is circled to clarify how a different sensor may be selected to function as the data sensor depending on the skew angle. Sensor 20 is shown aligned over track 502, and therefore functions as the data sensor. Sensor 20 is flanked by sensors 10 and 30. Either sensor 10 or sensor 30 may collect noise from track 503. Otherwise noise tracks adjacent to a target track, in this case 502, may degrade data that sensor 20 reads from track 502. As the actuator skews to the OD by a nonzero angle of less than six degrees, sensors 10 and 30 begin to separate farther from sensor 20 as illustrated in FIG. 5B. When transducer 135 is skewed even further, to greater than six degrees (for example to about 10 degrees) the overlap between sensors 10 and 20 is reduced to five percent or less. This reduced overlap condition results in the read channel 82 selecting a second pair of sensors to obtain accurate data from the target track. In particular, FIG. 5C illustrates a different sensor pair performing the read function previously performed by sensor 20. Noise can still be sensed by sensor 10. Thus, although the read channel will switch to a second pair of sensors when the original pair (first sensor pair) overlap by less than approximately five percent, there may be a common sensor between the first and second sensor pair. This is demonstrated by FIGS. 5B and 5C, where the first sensor pair (sensors 20 and 10) is replaced with a second sensor pair (sensors 30 and 10). When the second sensor pair performs a TDMR operation sensors 30 and 10 overlap by about 70-90%. However, when the overlap between a sensor pair is less than a predetermined amount (such as 5 percent), the read channel will switch to a different sensor pair. In one embodiment, the predetermined overlap may be less than five percent and as low as 0.5 percent. However, in other embodiments, the predetermined overlap may be greater than five percent and not more than 95 percent. In FIG. 5D, the actuator pivots slightly further toward the OD to a 12 degree skew angle, causing sensor 10 to occupy a greater space above track 503. Thus, in FIG. 5D, sensor 30 remains the data sensor and sensor 10 remains the noise sensor.

Turning to FIGS. 6A-6D, where the sensor array includes three sensors: 10, 20 and 30, one possible situation for the MD to ID operation will now be described. Although three sensors are shown in FIGS. 6A-6D, other embodiments may include a different number of sensors. The sensor array of FIGS. 6A-6D is simplified to exclude the shields and bias material.

During the TDMR operation of FIGS. 6A-6D, one of the sensors will be turned off, while the other two sensors are active. FIG. 6A illustrates sensors 10, 20 and 30 at zero skew along a middle diameter track. In the embodiment of FIG. 6A, sensor 20 reads data and noise, because of the three sensors, (10, 20, 30), sensor 20 is most closely aligned to target track 602. Sensor 20 is flanked by sensors 10 and 30, either of which may serve to collect noise at the edges between track 602 and track 603. In FIG. 6A, sensor 30 collects noise and sensor 10 is turned off.

As the actuator skews to the ID by a nonzero angle that is less than six degrees, sensors 10 and 30 begin to separate farther from data sensor 20 as illustrated in FIG. 6B. In addition, sensor 10 is nearly completely away from track 603 as can be seen in FIG. 6B. Sensor 30, on the other hand, is aligned more closely with track 603. Thus, in FIG. 6B, sensor 20 functions as the data sensor and sensor 30 as the noise sensor, while sensor 10 remains turned off. When the actuator pivots to greater than a six degree skew angle, the sensor array shifts to a new position, causing sensor 20 to become substantially misaligned with target track 602. Sensor 30, however, becomes aligned to target track 602 in FIG. 6C. Thus, the skew induced by actuator 50 triggers the read channel 82 to replace sensor 20 with sensor 30 as the data sensor in FIG. 6C. Sensor 10 continues to serve as the noise sensor in FIG. 6C, however, in other embodiments, sensor 10 may not remain as the noise sensor when the actuator pivots to a skew angle above six degrees. When the overlap of a first sensor pair is reduced to five percent or less, the read channel selects a second or third sensor pair to sense data and noise on the media. In certain embodiments, this ensures that the TDMR operation may be performed by sensors having an overlap of between 70-90%. Thus, track 602 is being read by a different sensor pair in FIG. 6C than in FIG. 6B. In addition, in FIG. 6C, sensor 20 is turned off. When the actuator is skewed at the ID by a 12 degree skew, the sensors are positioned as shown in FIG. 6D. In FIG. 6D, sensor 30 serves as the data sensor and sensor 10 collects noise. The sensor array discussed above may exhibit improved data signals and may be able to better account for noise due to adjacent tracks. Thus, in certain embodiments, the sensor array of FIGS. 6A-6D may provide higher recording densities for TDMR operations.

Figure 7:
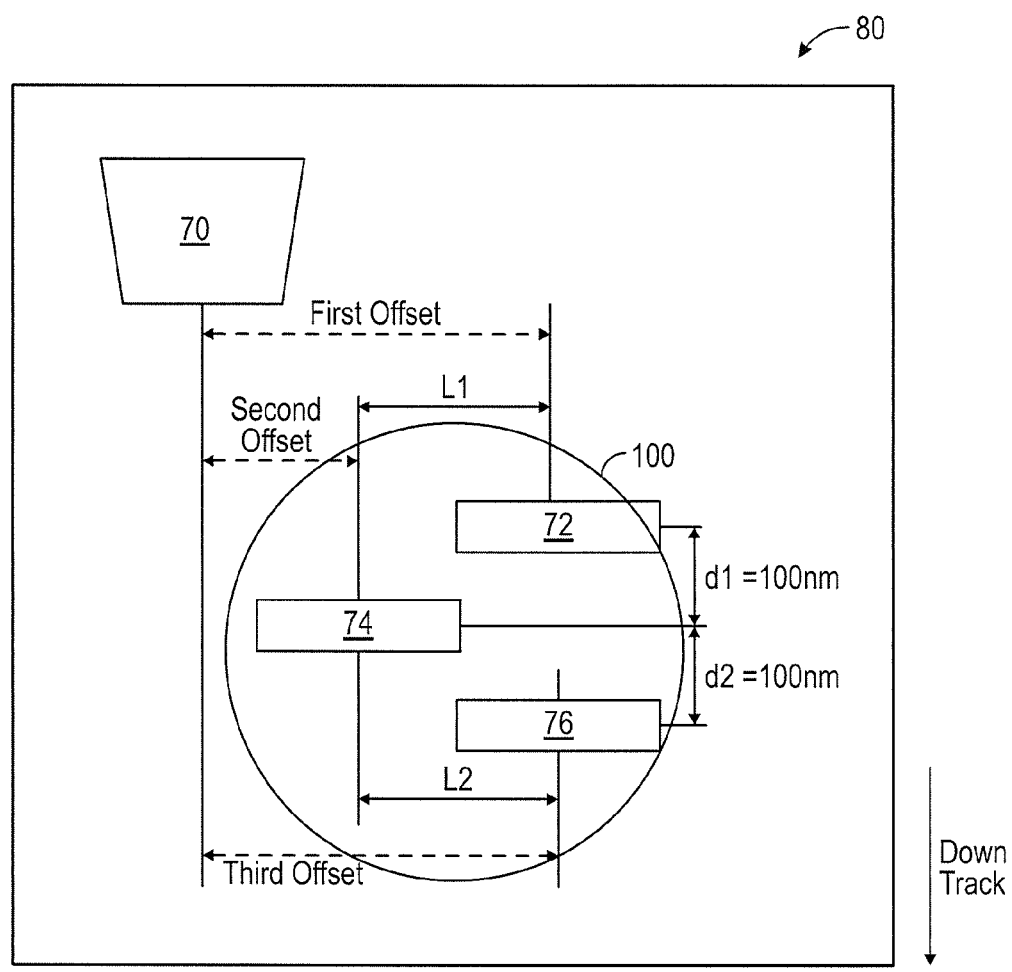
FIG. 7 illustrates a merged head that includes a sensor array suitable for TDMR.

An example of a configuration for a merged head that contains a write transducer and a read transducer is shown in FIG. 7. FIG. 7 illustrates a write transducer 70 and sensors 72, 74 and 76 on slider 80. As mentioned earlier, slider 80 may be attached to a suspension. L1 represents one possible separation distance between the center of sensor 72 to the center of sensor 74 in a down track direction. Whereas, L2 represents the separation distance between the center of sensor 74 and the center of sensor 76 in a down track direction. The distance separating sensor 72 from sensor 74 in a cross track direction in FIG. 7 is indicated by d1. Whereas, the distance separating sensor 74 from sensor 76 in the cross track direction is d2. Distances d1 and d2 in FIG. 7 may each be at least 50 nanometers and not more than 400 nanometers. In several embodiments, d1 and d2 are not equal. Although only three sensors are shown it is understood that transducer 100 may have a different number of sensors.

Each read sensor 72, 74 and 76 is offset from the writer by a certain distance as indicated by the broken arrows in FIG. 7. FIG. 7 represents one possible configuration for arranging multiple read sensors with respect to a write transducer.

The above detailed description is provided to enable any person skilled in the art to practice the various embodiments described herein. While several embodiments have been particularly described with reference to the various figures, it should be understood that these are for illustration purposes only.

Various modifications to these embodiments will be readily apparent to those skilled in the art, and generic principles defined herein may be applied to other embodiments. Thus, many changes and modifications may be made to the embodiments described herein, by one having ordinary skill in the art, without departing from the spirit and scope of the claims set forth below.

What is claimed is:

1. A storage device comprising:
   a sensor array comprising multiple read sensors in a down track direction, wherein a first pair of sensors reads media that includes a plurality of tracks, said plurality of tracks having a track pitch, said first pair of sensors including a first read sensor that reads data on one of said plurality of tracks, and a second read sensor that reads noise from an adjacent track of said plurality of tracks; and
   control circuitry to process signals from the first read sensor and the second read sensor of the first pair of sensors when the first read sensor overlaps the second read sensor, and wherein the control circuitry switches to a second pair of sensors to read data from said one of said plurality of tracks, when the first read sensor and the second read sensor overlap by less than 0.5%.

2. The storage device of claim 1 further comprising an actuator that supports the transducer, wherein the actuator has a skew angle, and wherein the second pair of read sensors reads data on one of said plurality of tracks when the skew angle of the actuator changes by −17 to +17 degrees.

3. The storage device of claim 1 wherein the control circuitry processes signals from the first read sensor and the second read sensor of the first pair of sensors by subtracting the noise detected by the second read sensor from the data detected by the first read sensor to thereby enhance the signal-to-noise ratio of the first read sensor.

4. The storage device of claim 1 wherein the multiple read sensors are displaced in the crosstrack direction.

5. The storage device of claim 1 wherein the first pair of sensors overlap in the cross track direction by at least 5% and not more than 90%.

6. The storage device of claim 1 wherein the first pair of sensors overlap in the cross track direction by at least 0.5% and not more than 95%.

7. The storage device of claim 1 wherein the sensor array includes a central read sensor having a first width and the remaining read sensors in the array each having a second width, said second width being greater than or equal to the first width.

8. The storage device of claim 1 wherein the sensor array includes a central read sensor having a first width and the remaining read sensors in the array each have a second width, said second width being smaller than the first width.

9. The storage device of claim 1 wherein each read sensor in the sensor array has a width equivalent to or less than 50% of the track pitch.

10. The storage device of claim 7 wherein the first width of the central sensor is between 50% and 120% of the track pitch.

11. The storage device of claim 7 wherein the first width of the central sensor is between 60% and 100% of the track pitch.

12. The storage device of claim 7 wherein the second width of the remaining sensors is between 80% and 120% of the track pitch.

13. The storage device of claim 1 further comprising:
 a plurality of shields interleaved with the multiple read sensors.

14. The storage device of claim 1 wherein each of the read sensors includes a free layer, and each read sensor is separated from an adjacent read sensor by a distance of at least 50 nm and not more than 400 nm, wherein the distance of separation is measured between the free layer of a read sensor of the multiple sensors to the free layer of a nearest sensor within the sensor array.

15. The storage device of claim 1 wherein said media comprises a substrate coated with magnetic material.

16. A storage device comprising:
 a media having concentric data tracks;
 a sensor array comprising read sensors that include at least a first sensor pair and a second sensor pair, each of said first and second sensor pairs including two or more read sensors, wherein the read sensors are separated in a down track direction, the down track direction being perpendicular to a track width direction;
 a suspension including at least one transducer having an air-bearing surface (ABS), the transducer including read sensors and at least two shields, wherein one or more of the read sensors is configured to read data from a target track on the media;
 an actuator for supporting the suspension, wherein the actuator assists in moving the transducer in close proximity to the media; and
 a read channel coupled to the actuator for switching from a first sensor pair to a second sensor pair when the first sensor pair becomes misaligned from the target track.

17. The storage device of claim 16 wherein the read channel processes signals from the first read sensor and the second read sensor of the first pair of sensors by subtracting the noise detected by the second read sensor from the data detected by the first read sensor to thereby enhance the signal-to-noise ratio of the first read sensor.

18. The storage device of claim 16 wherein the read channel switches from a first sensor pair to a second sensor pair when the actuator pivots from a first skew angle to a second skew angle that ranges between −17 to +17 degrees from a preset skew angle.

19. A method for reading data from a disk comprising:
 providing a transducer with a sensor array that includes read sensors in a down track direction;
 providing a disk having multiple tracks along an inner diameter and an outer diameter;
 moving the transducer from one track to another with an actuator; and
 reading a target track with a first sensor pair from the sensor array, wherein the first sensor pair comprises a first read sensor and a second read sensor and wherein the first read sensor reads noise and the second read sensor reads data, and
 reading the target track with a second sensor pair in the sensor array when the actuator skews about a pivot axis at an angle between −17 to +17 degrees.

20. The method of claim 19 wherein a second sensor pair in the sensor array reads data on the target track when the overlap between the first pair of read sensors is less than a predetermined overlap.

21. The method of claim 19 wherein the sensor array includes a central read sensor having a first width and the remaining read sensors in the array each have a second width greater than or equal to the first width.

22. The method of claim 20 wherein at least one of said read sensors is dormant while data is being read by said first or said second sensor pair.

23. The method of claim 19 wherein the read sensors are configured to read multiple tracks on the disk, said tracks having a track pitch and wherein each read sensor in the sensor array has a width equivalent to or up to twice the track pitch of said multiple tracks.

24. The method of claim 21 wherein the first width of the central sensor is between 50 and 120% of the track pitch.

25. The method of claim 21 wherein the first width of the central sensor is between 80 and 100% of the track pitch.

26. The method of claim 19 wherein each of the read sensors includes a free layer, and each read sensor is separated from an adjacent read sensor by a distance of at least 50 nm and not more than 400 nm, wherein the distance of separation is measured between the free layer of a read sensor of the sensor array to the free layer of a nearest sensor within the sensor array.

27. The method of claim 19 wherein the read sensors include a central read sensor having a first width and a remaining portion of read sensors having a second width, wherein the second width is smaller than the first width.

28. The method of claim 19 further comprising:
 a plurality of shields interleaved between the read sensors.

* * * * *